(12) United States Patent
Laubie et al.

(10) Patent No.: US 7,640,216 B2
(45) Date of Patent: Dec. 29, 2009

(54) METHOD FOR PREDICTING TIRE LIFE-CYCLE COST

(75) Inventors: Dave Laubie, Brentwood, TN (US); Len Hollinger, Brentwood, TN (US); Greg James, Murfreesboro, TN (US); Guy J. Walenga, Mt. Juliet, TN (US)

(73) Assignee: Bridgestone Americas Tire Operations, LLC

( * ) Notice: Subject to any disclaimer, the term of this patent is extended or adjusted under 35 U.S.C. 154(b) by 608 days.

(21) Appl. No.: 11/030,252

(22) Filed: Jan. 5, 2005

(65) Prior Publication Data

US 2006/0149688 A1 Jul. 6, 2006

(51) Int. Cl.
*G06F 17/00* (2006.01)

(52) U.S. Cl. .......................................... 705/401; 705/1
(58) Field of Classification Search .................. 705/1, 705/400
See application file for complete search history.

(56) References Cited

U.S. PATENT DOCUMENTS

| | | | | |
|---|---|---|---|---|
| 4,773,011 | A * | 9/1988 | VanHoose | 701/30 |
| 6,067,525 | A * | 5/2000 | Johnson et al. | 705/10 |
| 2003/0055754 | A1 * | 3/2003 | Sullivan | 705/31 |
| 2004/0236586 | A1 * | 11/2004 | Hirshkind, Jr. | 705/1 |
| 2005/0171835 | A1 * | 8/2005 | Mook et al. | 705/11 |

OTHER PUBLICATIONS

Schuring et al. (Schuring, D.J. and Redfield, J.S., Effect of Tire Rolling Loss on Fuel Consumption of Tires, SAE Technical Papers, (1983)).*

Luchini et al. (Luchini, J.R., Motil, M.M., and Mars, W.V., Tread Depth Effects on Tire Rolling Resistance, Tire Sci. and Technol., vol. 29, Issue 3, pp. 134-154 (Jul. 2001)).*

Knight (Knight, R.E., Correlation of Truck Tire Rolling Resistance as Derived From Fuel Economy and Laboratory Tests, SAE Technical Paper Series, Section 4, vol. 91 (1982)).*

Weber, Bob; "Trucks take on new role as second family vehicle of choice"; Chicago Tribune; Feb. 13, 1992; available at: http://proquest.umi.com/pqdweb?index=0&did=24439673&SrchMode=1&sid=3&Fmt=3&VInst=PROD&VType=PQD&RQT=309&VName=PQD&TS=1234192122&clientId=19649.*

"Tire Safety-Everything Rides On It"; US Department of Transportation; Oct. 2001 (accessed Dec. 4, 2003; available at: http://web.archive.org/web/20031204195214/http://www.nhtsa.dot.gov/cars/rules/TireSafety/ridesonit/brochure.htm).*

(Continued)

Primary Examiner—John W Hayes
Assistant Examiner—Kevin Flynn
(74) Attorney, Agent, or Firm—Thomas R. Kingsbury (57) ABSTRACT

Exemplary embodiments provide a technique for determining life cycle cost of a tire that includes combining initial purchase information and an assessment of operating costs for a customer. Determination of operating costs includes correlating roll resistance with respect to inflation pressure and vehicle imposed load of the tire, as well as usage of the tire. The inflation pressure and vehicle imposed load are acquired for a configuration of the vehicle. The roll resistance can be determined for the pressure and load of the tire at a characteristic tread depth. The fuel consumption required for overcoming the roll resistance by the vehicle can be determined from the roll resistance and a unit cost of the fuel consumption. The operating cost can be determined from the fuel consumption multiplied by the unit cost. The life cycle cost can be determined by combining the purchase cost and the operating cost of the tire.

22 Claims, 5 Drawing Sheets

OTHER PUBLICATIONS

Goodyear's G302 easy on the Fuel; Motor Truck, v66n6, pp. 8; Dec. 1997.*

Transportation: Meeting to Discuss Energy Efficiency; Energy Conservation News, v24n7; Feb. 2002.*

Deierlein, Bob; Fleet Management, v19n11, pp. 32-35; Nov. 1993.*

M. Brendan Rodgers and Stanley M. Mezynski; A look at heavy-duty truck tires; Rubber & Plastic News, p. 17; Nov. 8, 1993.*

TRANS/WP.29/GRRF/2003/30, "Proposal for Draft Amendments to Regulations Nos. 30 and 54", Jul. 24, 2003, United Nations EASC, ECFE, ITC, World Forum, Working Party on Brakes & Running Gear, $54^{th}$ session, item 6.2.

TRANS/WP.29/GRRF/2003/30/Corr. 1, "Proposal for Draft Amendments to Regulations Nos. 30 and 54", Sep. 9, 2003, United Nations EASC, ECFE, ITC, World Forum, Working Party on Brakes & Running Gear, $54^{th}$ session, item 6.2.

* cited by examiner

METHOD FOR PREDICTING TIRE LIFE-CYCLE COST

BACKGROUND OF THE INVENTION

1. Field of Invention

This invention relates to devices and methods directed to determining tire life cycle cost.

2. Description of Related Art

Tires can impose costs at purchase and over the useful life of the tire, such as in the trucking industry, for example. In fact, tire manufacturers can provide customers with list prices for various brands and models appropriate for particular applications desired by the trucking industry consumer. Such pricing information can be helpful to prospective customers for deciding which brand and model to purchase for their trucking fleets.

Tires are sold for particular tire categories, depending on, for example, customer-anticipated load, road conditions, and expected use. Customers can compare the list price between brands for particular tire categories based on their projected requirements. However, list price provides an incomplete measure of a consumer's total cost over the period of the tire's use. Tires having similar size and load-bearing characteristics may, due to differences in quality or design, experience differing wear rates or other factors that influence useful duration before replacement becomes necessary. Such information is typically unavailable to retail outlets or customers in any convenient form.

SUMMARY OF THE INVENTION

Various exemplary embodiments of the invention provide a technique for determining life cycle cost of a tire, which includes combining initial purchase information and an assessment of operating costs for a customer. Determining operating costs includes correlating roll resistance with respect to inflation pressure and vehicle imposed load of the tire, as well as usage of the tire. The inflation pressure and vehicle imposed load are acquired for a configuration of the vehicle. The roll resistance can be determined for the pressure and load of the tire at a characteristic tread depth. The fuel consumption required for overcoming the roll resistance by the vehicle can be determined from the roll resistance and a unit cost of the fuel consumption. The operating cost can be determined from the fuel consumption multiplied by the unit cost. The life cycle cost can be determined by combining the purchase cost and the operating cost of the tire.

BRIEF DESCRIPTION OF THE DRAWINGS

Various exemplary embodiments of the devices, systems and methods of this invention will be described in detail with reference to the following figures, wherein.

DETAILED DESCRIPTION OF EXEMPLARY EMBODIMENTS

The following detailed description of various exemplary embodiments of tire life cycle prediction systems or other technologies that determine purchase and consumption costs of tires, according to exemplary embodiments of this invention, may refer to one or more examples of cost data, for the sake of clarity and familiarity. However, it should be appreciated that the principles of this invention, as outlined and/or discussed below, can be equally applied to any related art, known or later-developed tire life cycle systems, beyond the configurations specifically discussed herein.

Customers of tires can compare list prices for specific sizes and types from various brands. Although such information often facilitates decisions on the brand and model with respect to initial purchase cost, consumers can enhance or improve the comprehensiveness of their selections if tires are compared by life cycle cost. In particular, trucking companies maintain inventory information regarding mileage and fuel costs associated with the tires used in the road-mobile cargo transport industry. This comparison requires determining the initial costs associated with purchase and installation, as well as usage costs until disposition of the tire, as provided by exemplary embodiments of the invention.

The tires employed in trucking fleets are typically distinguished by position on the trucking vehicle. In particular, a truck includes a tractor that propels the truck and a trailer that carries the loaded cargo. An engine on the tractor provides the torque to rotate the drive axles on which the drive wheels are mounted. A steering system on the tractor enables the truck to be controllably turned by pivoting the steering axles on which the steering wheels are mounted. The trailer is supported by trailer axles on which the trailer wheels are mounted. Each of the steering, drive and trailer axles carry a particular number of tires. For a properly configured trucking vehicle, the load of the cargo and vehicle are distributed among all the tires engaged with the road. Trucking companies determine time-averaged load values, based in part on the maximum load permitted by law (80,000 pounds-mass), and the intervals in which trailers are empty or tractors are traveling detached. Trucking companies also maintain tires at target inflation pressures when cold.

Figure 1:
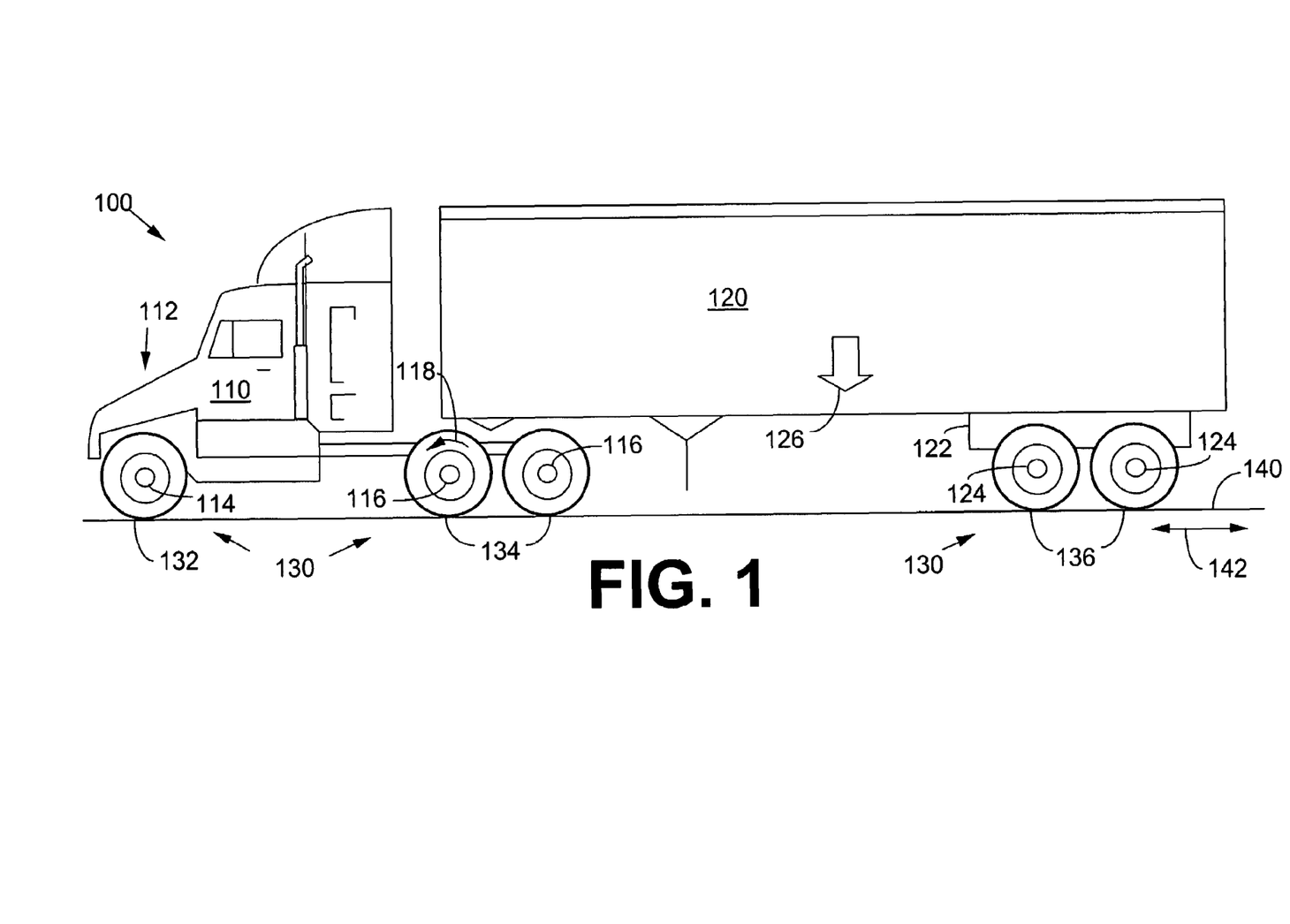
FIG. 1 is a schematic that shows a semi-tractor-trailer truck equipped with tires for life cycle cost determination, in accordance with an exemplary embodiment of the invention.

FIG. 1 shows a trucking vehicle 100 including a tractor 110 and a trailer 120, each equipped with wheels 130. The tractor 110 includes an engine 112, steer axle 114 and drive axles 116. The engine 112 applies torque 118 to the drive axles 116. The trailer 120 includes a wheel suspension 122 that maintains the trailer axles 124 for carrying a load 126. The wheels 103 include steer wheels 132 mounted on the steer axle 114, drive wheels 134 mounted on the drive axles 116, and trailer wheels 136 mounted on the trailer axles 124. The wheels 130 engage a road surface 140 enabling the truck 100 to travel a road distance 142.

The initial costs associated with purchase and delivery of tires include more than the manufacturer's list price. State and federal requirements may impose sales, excise, value-added and other taxes, as well as regulatory fees and official charges paid at the time of purchase. Further, delivery may be contracted (free-on-board) to the manufacturer, or to the local retailer. Shipment costs may thus be imposed to the customer at the trucking warehouse facility. Additionally, unless the tires are stored as spares or for inventory, the customer incurs labor charges associated with installation and balancing of the tires onto the trucking vehicles involved.

Figure 2:
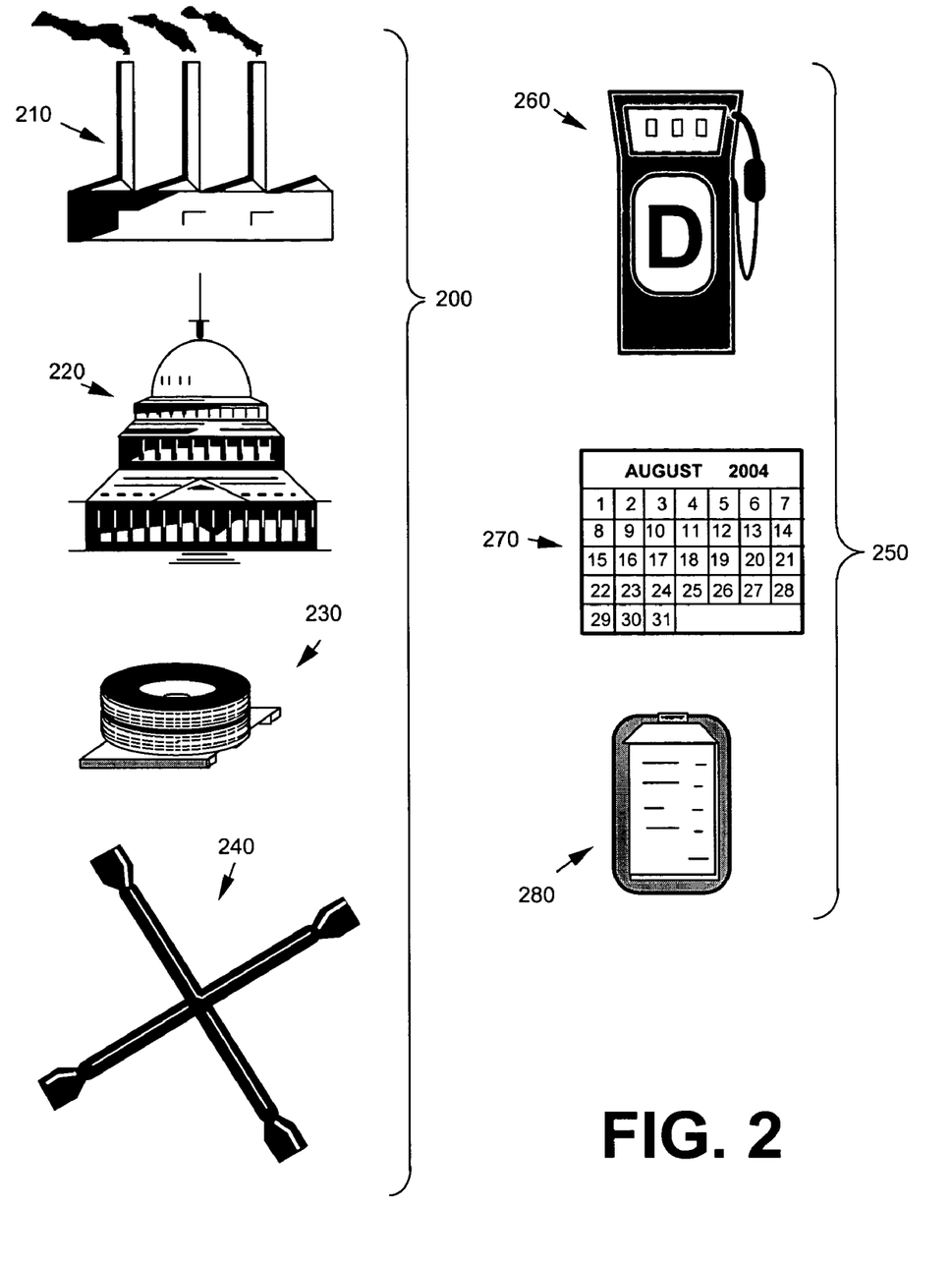
FIG. 2 is a schematic that shows a symbolic list of cost contributors for purchase and maintenance, in accordance with an exemplary embodiment of the invention.

FIG. 2 shows exemplary costs associated with purchase cost 200 and maintenance costs 250 of tires in a truck fleet. For example, the purchase cost 200 includes the manufacturer's list price 210, government taxes 220, delivery and storage costs 230 and installation charges 240. The manufacturer's costs include raw materials, production labor, facility amortization, delivery charges and corporate profit in the list price, as represented by a foundry icon. The state and federal authorities impose various revenue and regulatory obligations that the customer pays as sales, excise and/or value added taxes, as represented by the capitol dome. Shipping (e.g., free-on-board supplier) and warehouse storage costs may be included for delivery of the product, as represented by a pallet. Labor and equipment for installation enables mounting and balancing the tires onto the vehicles, as represented by a lug cross-bar.

Operational costs 250 include fuel consumption 260, and must consider replacement period 270 and other inventory information 280. The fuel consumption caused by the tires results from the frictional force between the wheels 130 and the road 140 to be overcome by the engine 112. The replacement period, and associated residual value, is represented by a calendar, while the inventory information is represented by a clipboard. Maintenance costs associated with labor for rotating and repairing tires may also be considered.

During the usage period when the tires on the trucking vehicles are being used on the road, the tires experience wear. In addition, the tires impose friction against the road surface that must be overcome by engine torque in order to roll the tires on the truck for transport along the highway. The engine consumes diesel fuel to provide the torque applied to the drive axles for rolling the wheels. The fuel has an amortized cost associated with its periodic or contract purchase while the truck is in road use.

Due to wear from the friction against the road surface, a tire has a limited service life before replacement is mandated by regulation or structural failure. Tires form a cylindrical toroid and engage the road surface along its outer cylindrical surface. In order to improve traction for a variety of weather conditions, this outer surface is indented with tread marks running in multiple circumferential and transverse directions. At manufacture, the tread marks have an original tread depth, such as $30/32"$. As the tire rolls down the road, this outer surface recedes and the tread depth is reduced. Eventually, this tread depth may diminish to about $2/32"$ for trailer tires (or $7/32"$ for drive tires) at which time the tire must be replaced. The trucking industry typically records mileage associated with the tire from original to removal tread depth (e.g., about 120,000 miles). At removal, the tire has a residual recycle or reclamation value for the tire casings, which offsets the initial purchase cost.

The roll resistance varies as a function of tread depth, typically decreasing from the original tire condition. Related art or conventional estimates of fuel consumption based on roll resistance employ test values of tires as originally manufactured. In accordance with various exemplary embodiments of the invention, the value of roll resistance used in determining fuel costs over the useful life of the tire accounts for the roll resistance variation with tread depth. To establish an average roll resistance over the tire's useful life, the test data are acquired for specific conditions at various tread depths on a calibrated rolling drum.

Figure 3:
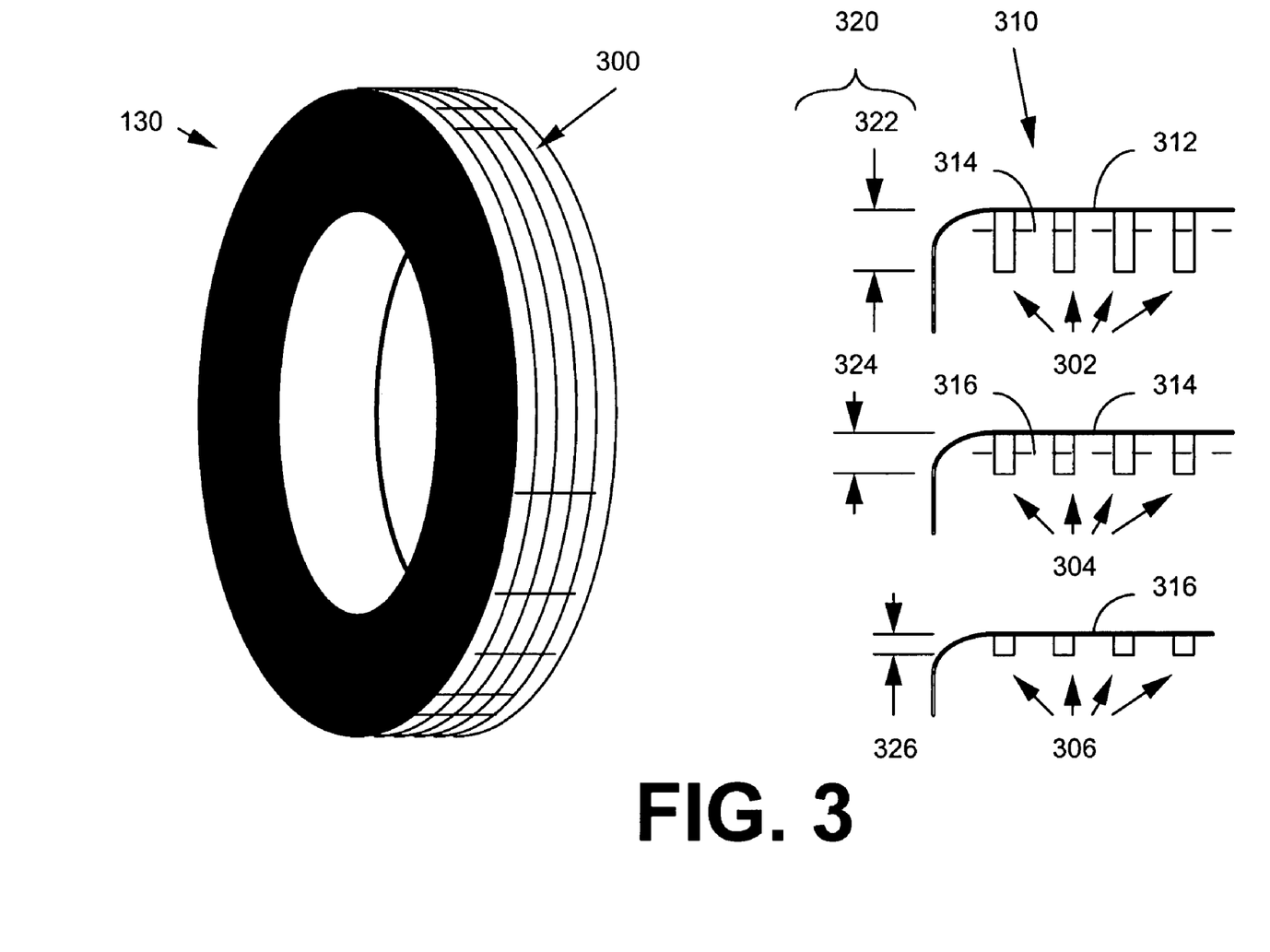
FIG. 3 is a schematic that shows a tire and tread under the test conditions for which data are obtained for life cycle cost determination, in accordance with an exemplary embodiment of the invention.

FIG. 3 shows tread conditions represented for roll resistance tests. In particular, a tire on a wheel 130 features treads 300. The tire begins with an original tread 302. Halfway through its operation, the tire wears down to a mid-life tread 304. Finally, statutes require tires to be replaced when the tread 306 is worn to about $2/32"$. The surfaces tested 310 are represented by friction and associated torque to overcome that friction at the test. These include the original surface 312, mid-life surface 314 and replacement surface 316, corresponding to their respective tread depths 320. The roll resistance tests are conducted on the tire with original tread depth 322, mid-life tread depth 324 and replacement tread depth 326.

Examples of testing regimens for roll resistance include five-step standards published by the Society of Automotive Engineers, such as SAE J1269 and SAE J1270. Such tests may be conducted over a specific range of tire loads and pressure. For example, a tire can be subjected to 110 pounds-per-square-inch (psi) capped (i.e., adiabatic) until equilibrium is reached, followed by a reduction to 100 psi regulated constant pressure (i.e., isobaric), and subsequently transitioning to a duty cycle of various loads supported by the tire.

In particular, roll resistance can be determined as a value in units of force and yield a series of coefficients based on the inflation pressure and tire load. The coefficients can be input into a formula based for roll resistance force as a function of tire load (vehicle weight divided by the number of tires) and pressure (initial target value when cold). The coefficients typically include a first coefficient for an offset value (at no load or pressure in units of force), a second coefficient multiplied by the tire load (dimensionless), a third coefficient multiplied by load divided by pressure (in units of area-per-force), and a fourth coefficient multiplied by load squared divided by pressure (in units of area-per-force-squared). The test data can be quantified using pounds-force for units of force and pounds-per-square-inch for units of pressure.

In accordance with various exemplary embodiments of the invention, the roll resistance data are obtained for tread conditions from original to replacement. The testing facility measures the roll resistance data for an originally manufactured tire (tread depth of $30/32"$). Upon completion of these original tread measurements, the tire is buffed to approximately midway between the original and replacement tread depths ($16/32"$). The testing facility again measures the roll resistance data for the tire in the mid-tread condition.

Upon completion of these mid-way measurements, the tire is again buffed to about replacement tread depth ($2/32"$). The testing facility again measures the roll resistance data for the tire in the replacement condition. For example, in evaluating the test data to determine average roll resistance, the calculated value midway between original and replacement tread depths is characterized as the average operating condition of the tire. Roll resistance data from the approximately mid-way are interpolated using the slope of roll resistance with tread depth between the original and replacement conditions to determine the roll resistance coefficients for the average operating conditions. The roll resistance can be correlated with average load, as determined for the trucks within the fleet divided by the number of truck tires on the road, and the target maintenance pressures. In addition, roll resistance can be correlated with driving or braking torque applied to radial tires installed on the drive axles, which reduces slightly the roll resistance as compared to equivalent tires on the trailer axles.

The roll resistance coefficients for average operating conditions can be used to calculate roll resistance forces from the tires as a function of average load. The work required to overcome the friction between tire and road represents the determined roll resistance force multiplied by a unit distance applied. For example, work in foot-pounds-force (ft-lb$_f$) normalized per statute mile can be determined by multiplying the roll resistance by 5280 feet per mile. To convert to British-thermal-units (Btu), the work quantity in foot-pounds is divided by factor 770. Thus, the normalized roll resistance work is converted to Btu per mile by multiplying the determined force by 6.857 (=5280 ft-lb/770 Btu-mi).

One barrel (bbl) is equal to 42 U.S. gallons (gal). The heating value of diesel is ~137 thousand-Btu per gallon (kBtu/gal) or ~5.75 mega-Btu per barrel (MBtu/bbl). Thus, the quantity of diesel fuel in gallons to overcome a normalized unit roll resistance per tire in foot-pounds per mile (i.e., 1 ft-lb/mi) can be calculated by multiplying the roll resistance force by $5.0 \times 10^{-5}$. This conversion is performed by 5280 ft-lb/{770 Btu/ft-lb×($1.37 \times 10^5$) gal/Btu-mi}=0.0056 gal/ft-lb.

Because engine combustion efficiency is rated typically at about forty percent, the quantity of diesel in gallons (gal) or barrels (bbl) can be divided by 0.4 to obtain gallons per mile consumed to overcome the roll resistance. This value represents about one-third of the fuel consumed by the trucking industry on the road, the remaining two thirds being established as functions of aerodynamic drag and other factors. In this manner, the fuel consumption costs associated with a particular brand and model tire can be directly compared with values from competing tires.

A total life cycle cost can be determined from a combination of the purchase costs 200 and the operation costs 250. The determination of fuel costs based on a realistic assessment of the roll resistance, together with reclamation offsets and the costs for taxes, delivery, installation, inventory, storage and maintenance, provide a comprehensive measure of comparison between brands and models. This information can be helpful in assisting customers in balancing costs and benefits between list price and predicted useful tire life.

Figure 4:
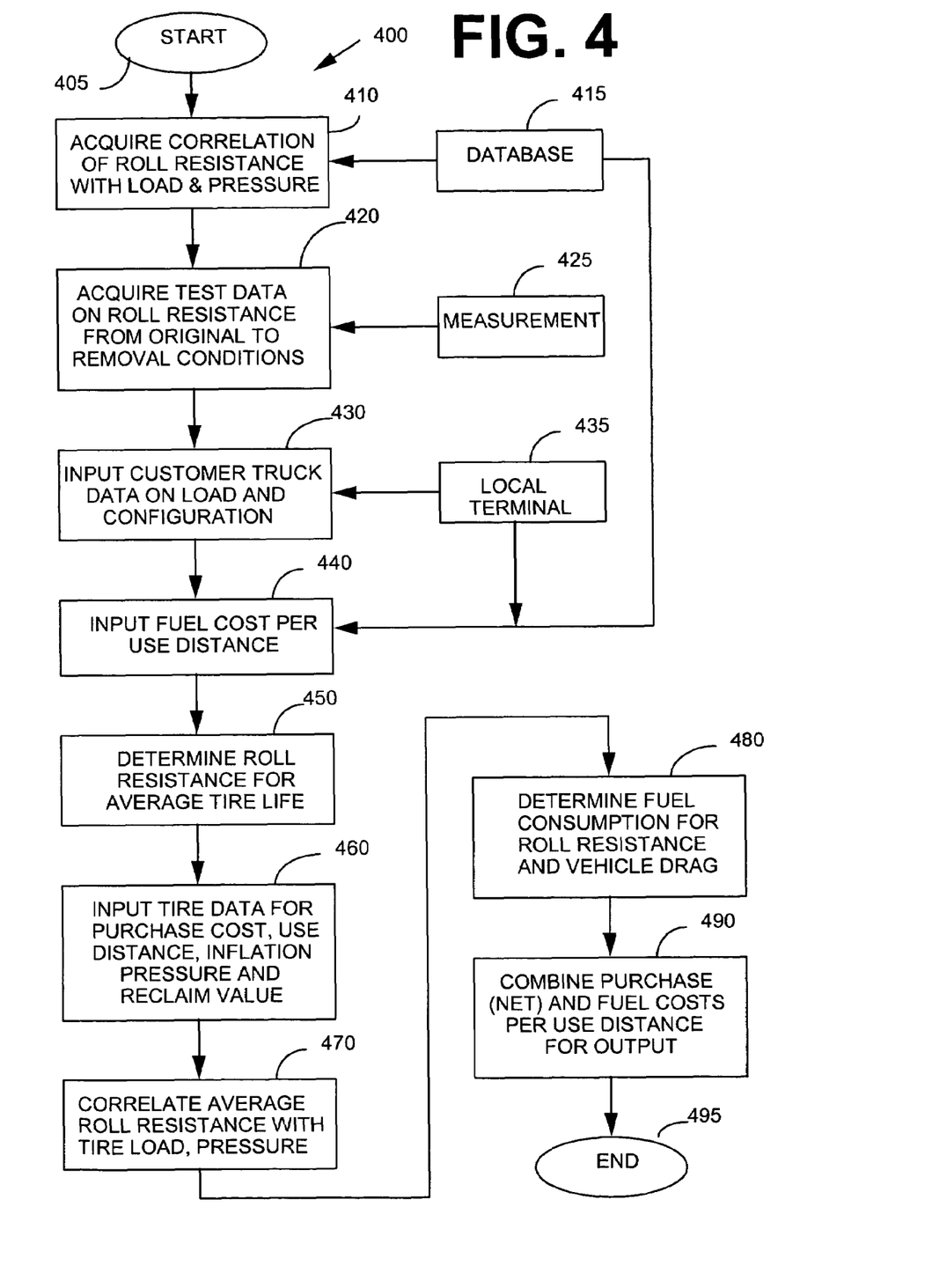
FIG. 4 is a flowchart of the procedures for predicting life cycle cost of tires, in accordance with an exemplary embodiment of the invention.

FIG. 4 is a flow chart 400. The procedures begin at start 405 and proceed to acquire correlations of roll resistance variation with respect to load and pressure at step 410. These factors for predicting roll resistance are available through a database 415. Next, the procedures continue to acquire test data on roll resistance of tires for a characteristic tread depth representing the average life-cycle tire condition at step 420. The tests are performed at standard sequence of inflation pressure, temperature and load. The tire conditions include variations in tread depth from the original to removal conditions. The roll resistance data are acquired by test measurements 425 from a laboratory facility.

The customer provides truck data on average carrying load during transport and configuration of axles and wheels for the tractor and trailer at step 430. This information can be provided from a local terminal 435 at the customer's retail outlet. Fuel cost per distance in use is input at step 440, provided from either the customer's retail outlet 435 or the database 415. The roll resistance or average tire life is determined at step 450. The tire data for purchase cost, expected distance of use, operating conditions, such as inflation pressure, and residual value upon reclamation, are input at step 460.

The roll resistance data are correlated with the customer's operating configuration to determine the average value over the period that the tire is used at step 470. The operating configuration includes average tire load based on average truck loading data, inflation pressure, tire position (i.e., steer, drive or trailer). The fuel consumption based on roll resistance and vehicle drag is determined at step 480 to determine the operating cost. The net purchase cost (i.e., minus the reclaim value) and the operating cost as fuel consumption over the distance used are combined as present value life cycle cost and output for customer comparison at step 490. Then, the procedure terminates 495.

A combination of the fuel costs, total purchase charges, with reclamation value subtracted provides the trucking industry consumer with a present-value opportunity cost comparison between tire models. Thus, the various embodiments of the invention enable the consumer to make a more informed business decision than possible with only list price. The customer can avail of this information at a retail outlet terminal for providing inventory data on tire mileage, truck configuration, etc. Through the terminal, a network can provide access to the database that stores the roll resistance measurements and the correlation values, and the processor that processes the calculations to synthesize the information. By exchanging customer configuration, test data and correlation information, the customer can obtain the life cycle costs for various tire brands and models for comparison.

Figure 5:
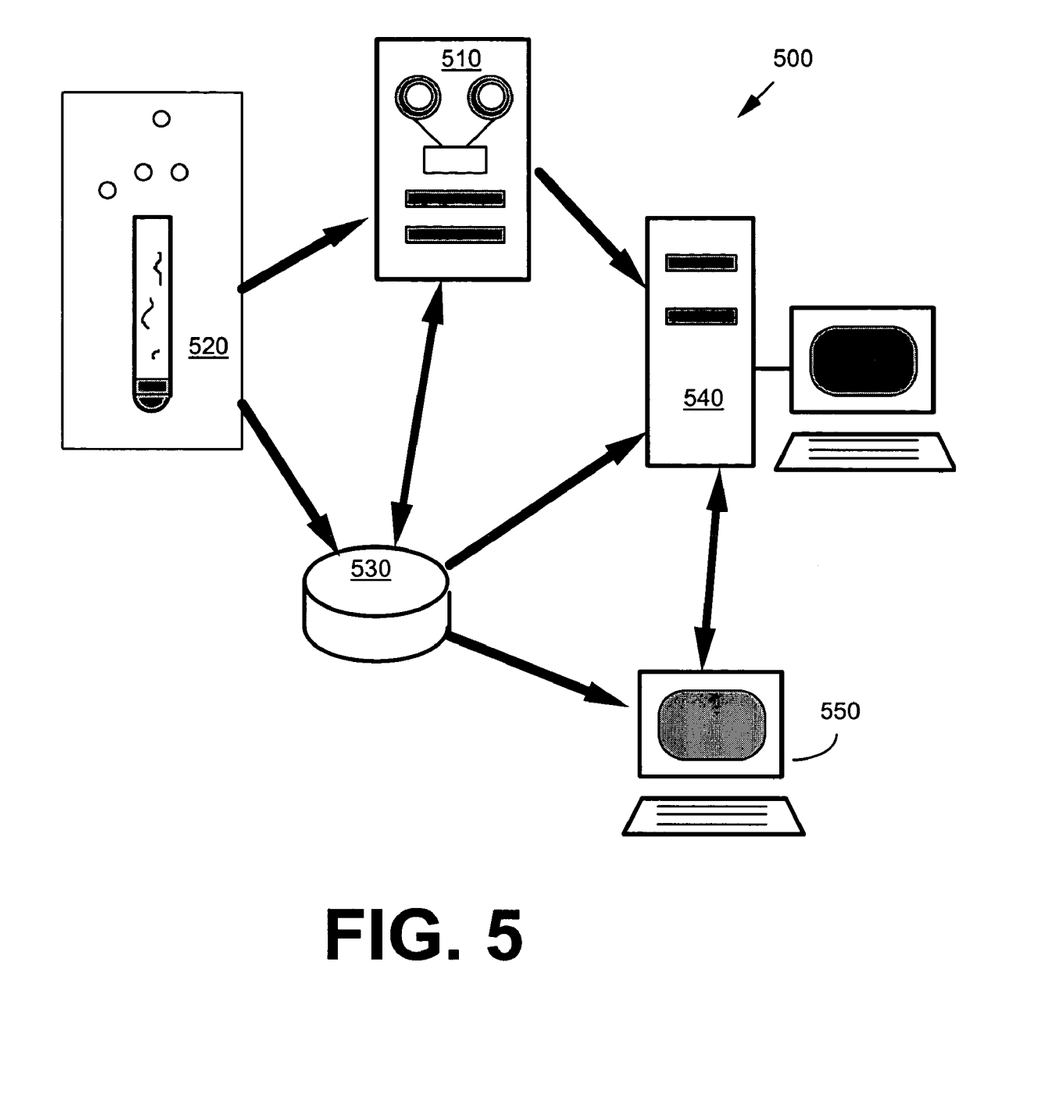
FIG. 5 is a schematic that shows a network for the data and processing exchange to predict life cycle cost of tires, in accordance with an exemplary embodiment of the invention.

FIG. 5 shows a network 500. A processor 510 compiles and calculates correlations based on input data related to a customer's requirements. The laboratory facility 520 provides the test data of roll resistance at the tested tire conditions, which can be supplied to a database 530 or to the processor 510. The database 530 may also include additional information regarding the tires, including data related to list price, shipping costs and government excise fees. A server 540 receives the processed and stored data from the processor 510 and database 530, respectively. A terminal 550 at the customer's retail outlet can access the server 540, as well as any necessary correlation data stored in the database 530. The customer can manually provide the input data, or with particular selections, such as generic configurations, the input data can be provided automatically from the database 530. Also, while the customer can use the terminal 550 to use the test data or other information in the database 530, the customer may also query the processor 510 via the server 540 to perform calculations based on customer-supplied data.

While this invention has been described in conjunction with exemplary embodiments outlined above, many alternatives, modifications and variations will be apparent to those skilled in the art. Accordingly, the exemplary embodiments of the invention, as set forth above, are intended to be illustrative, not limiting. In particular, while examples are directed to the trucking industry, the invention is applicable to many other circumstances. Various changes can be made without departing from the spirit and scope of the invention.

What is claimed is:

1. A method for determining tire life cycle cost, comprising:

accessing, from a database, a purchase cost of an individual tire for installation on a vehicle;

obtaining, from a testing facility, test results that correlate roll resistance with respect to various values of inflation pressure and vehicle imposed load of the tire at a characteristic tread depth of the tire;

acquiring, from a customer, a specific inflation pressure of the tire, an installation position of the tire and an average load of the vehicle;

establishing, by a computer processor, an operating configuration including (i) an average load of the tire based on the average load of the vehicle, (ii) the specific inflation pressure and (iii) the installation position of the tire;

determining, from the test results, by the computer processor, the roll resistance of the tire for the operating configuration at the characteristic tread depth;

weighting the roll resistance of the tire based on the installation position of the tire;

determining, by the computer processor, fuel consumption required for overcoming the weighted roll resistance of the tire;

acquiring a unit cost of the fuel consumption;

determining, by the computer processor, operating cost of the tire from the fuel consumption multiplied by the unit cost;

combining, by the computer processor, the purchase cost of the tire and the operating cost of the tire to obtain a life cycle cost of the tire; and outputting the life cycle cost from the computer processor to a terminal.

2. The method for determining tire life cycle cost according to claim 1, wherein determining the roll resistance further comprises establishing the characteristic tread depth as approximately midway between an original condition and a replacement condition.

3. The method for determining tire life cycle cost according to claim 2, wherein determining the roll resistance further comprises:

determining the roll resistance at an original condition from measurement;

determining, subsequent to buffing the tire to an intermediate tread depth between the original condition and a replacement condition, the roll resistance at the intermediate tread depth from measurement;

determining, subsequent to buffing the tire to an end tread depth corresponding approximately to the replacement condition, the roll resistance at the end tread depth from measurement;

determining a slope between the roll resistance at the original condition and the roll resistance at the end tread depth; and interpolating from the roll resistance at the intermediate tread depth to the characteristic tread depth with the slope to obtain the roll resistance at the characteristic tread depth.

4. The method for determining tire life cycle cost according to claim 1, wherein the purchase cost comprises:

a supplier's list price of the tire;

government fees and taxes on a purchase transaction of the tire;

delivery cost of transporting the tire to a customer; and installation cost for installing the tire on the vehicle.

5. The method for determining tire life cycle cost according to claim 4, wherein the government fees and taxes comprise:

state and local sales taxes;

regulatory fees;

federal excise taxes; and value added taxes.

6. The method for determining tire life cycle cost according to claim 1, wherein establishing the operating configuration of the vehicle further comprises:

acquiring a first number of drive axles on a tractor of the vehicle, and a second number of tires on each of the drive axles;

acquiring a third number of steer axles on the tractor, and a fourth number of tires on each of the steer axles;

acquiring a fifth number of trailer axles on a trailer of the vehicle, and a sixth number of tires on each of the trailer axles; and determining a total number of tires from a sum of a drive product of the first and second numbers plus a steer product of the third and fourth numbers plus a trailer product of the fifth and sixth numbers.

7. The method for determining tire life cycle cost according to claim 1, wherein establishing the operating configuration of the vehicle further comprises:

acquiring a useful distance traveled for the tire from an original condition to a replacement condition; and acquiring a reclamation value for the tire at the replacement condition.

8. The method for determining tire life cycle cost according to claim 6, wherein determining the roll resistance for the operating configuration at the characteristic tread depth further comprises:

establishing the characteristic tread depth as approximately midway between an original condition and a replacement condition;

correlating the roll resistance for the tire load and the inflation pressure at the original condition; and extrapolating the roll resistance from the original condition to the characteristic tread depth.

9. The method for determining tire life cycle cost according to claim 1, wherein determining fuel consumption required for overcoming the roll resistance of the tire further comprises:

converting the roll resistance to normalized work per unit distance;

converting the work to a quantity of fuel per unit distance from a fuel heating value associated with the fuel consumption; and correcting the quantity of fuel per unit distance by an engine efficiency for obtaining the fuel consumption.

10. The method for determining tire life cycle cost according to claim 1, wherein determining operating cost further comprises adding costs for inventory, storage and maintenance associated with the tire.

11. A machine-readable storage medium having executable software code for determining tire life cycle cost, the software code comprising:

a program for accessing, from a database, a purchase cost of an individual tire for installation on a vehicle;

a program for obtaining, from a testing facility, test results that correlate roll resistance with respect to various values of inflation pressure and vehicle imposed load of the tire at a characteristic tread depth of the tire;

a program for acquiring, from a customer, a specific inflation pressure of the tire, an installation position of the tire and an average load of the vehicle;

a program for establishing, by a computer processor, an operating configuration including (i) an average load of the tire based on the average load of the vehicle, (ii) the specific inflation pressure and (iii) the installation position of the tire;

a program for determining, from the test results, by the computer processor, the roll resistance of the tire for the operating configuration at the characteristic tread depth;

a program for weighting the roll resistance of the tire based on the installation position of the tire;

a program for determining, by the computer processor, fuel consumption required for overcoming the roll resistance of the tire;

a program for acquiring a unit cost of the fuel consumption;

a program for determining, by the computer processor, operating cost of the tire from the fuel consumption multiplied by the unit cost;

a program for combining, by the computer processor, the purchase cost of the tire and the operating cost of the tire to obtain a life cycle cost of the tire; and a program for outputting the life cycle cost.

12. The machine-readable storage medium for determining tire life cycle cost according to claim 11, wherein the program for determining the roll resistance further comprises a program for establishing the characteristic tread depth as approximately midway between an original condition and a replacement condition.

13. The machine-readable storage medium for determining tire life cycle cost according to claim 12, wherein the program for determining the roll resistance further comprises:
   a program for determining the roll resistance at an original condition from measurement;
   a program for determining, subsequent to buffing the tire to an intermediate tread depth between the original condition and a replacement condition, the roll resistance at the intermediate tread depth from measurement;
   a program for determining, subsequent to buffing the tire to an end tread depth corresponding approximately to the replacement condition, the roll resistance at the end tread depth from measurement;
   a program for determining a slope between the roll resistance at the original condition and the roll resistance at the end tread depth; and
   a program for interpolating from the roll resistance at the intermediate tread depth to the characteristic tread depth with the slope to obtain the roll resistance at the characteristic tread depth.

14. The machine-readable storage medium for determining tire life cycle cost according to claim 11, wherein the purchase cost comprises:
   a supplier's list price of the tire;
   government fees and taxes on a purchase transaction of the tire;
   delivery cost of transporting the tire to a customer; and
   installation cost for installing the tire on the vehicle.

15. The machine-readable storage medium for determining tire life cycle cost according to claim 14, wherein the government fees and taxes comprise:
   state and local sales taxes;
   regulatory fees;
   federal excise taxes; and
   value added taxes.

16. The machine-readable storage medium for determining tire life cycle cost according to claim 11, wherein the program for establishing the operating configuration of the vehicle further comprises:
   a program for acquiring a first number of drive axles on a tractor of the vehicle, and a second number of tires on each of the drive axles;
   a program for acquiring a third number of steer axles on the tractor, and a fourth number of tires on each of the steer axles;
   a program for acquiring a fifth number of trailer axles on a trailer of the vehicle, and a sixth number of tires on each of the trailer axles; and
   a program for determining a total number of tires from a sum of a drive product of the first and second numbers plus a steer product of the third and fourth numbers plus a trailer product of the fifth and sixth numbers.

17. The machine-readable storage medium for determining tire life cycle cost according to claim 11, wherein the program for establishing the operating configuration of the vehicle further comprises:
   a program for acquiring a useful distance traveled for the tire from an original condition to a replacement condition; and
   a program for acquiring a reclamation value for the tire at the replacement condition.

18. The machine-readable storage medium for determining tire life cycle cost according to claim 16, wherein the program for determining the roll resistance for the operating configuration at the characteristic tread depth further comprises:
   a program for establishing the characteristic tread depth as approximately midway between an original condition and a replacement condition;
   a program for correlating the roll resistance for the tire load and the inflation pressure at the original condition; and
   a program for extrapolating the roll resistance from the original condition to the characteristic tread depth.

19. The machine-readable storage medium for determining tire life cycle cost according to claim 11, wherein the program for determining fuel consumption required for overcoming the roll resistance of the tire further comprises:
   a program for converting the roll resistance to normalized work per unit distance;
   a program for converting the work to a quantity of fuel per unit distance from a fuel heating value associated with the fuel consumption; and
   a program for correcting the quantity of fuel per unit distance by an engine efficiency for obtaining the fuel consumption.

20. The machine-readable storage medium for determining tire life cycle cost according to claim 11, wherein the program for determining operating cost further comprises a program for adding costs for inventory, storage and maintenance associated with the tire.

21. The machine-readable storage medium for determining tire life cycle cost according to claim 11, wherein the program for establishing the operating configuration of the vehicle acquires at least one of (i) manual input from an input device, or (ii) an established configuration.

22. A method for selling tires to a customer, wherein one factor includes determining tire life cycle cost, the method comprising:
   accessing, from a database, a purchase cost of an individual tire for installation on a vehicle;
   obtaining, from a testing facility, test results that correlate roll resistance with respect to inflation pressure and vehicle imposed load of the tire at a characteristic tread depth of the tire;
   acquiring, from a customer, a specific inflation pressure of the tire, an installation position of the tire and an average load of the vehicle;
   establishing, by a computer processor, an operating configuration including (i) an average load of the tire based on the average load of the vehicle, (ii) the specific inflation pressure and (iii) the installation position of the tire;
   determining, from the test results, by the computer processor, the roll resistance of the tire for the operating configuration at the characteristic tread depth;
   weighting the roll resistance of the tire based on the installation position of the tire;
   determining, by the computer processor, fuel consumption required for overcoming the roll resistance of the tire;
   acquiring a unit cost of the fuel consumption;
   determining, by the computer processor, operating cost of the tire from the fuel consumption multiplied by the unit cost;
   combining, by the computer processor, the purchase cost and the operating cost of the tire to obtain a life cycle cost of the tire; and
   using the life cycle cost to sell the tire to the customer.

* * * * *

UNITED STATES PATENT AND TRADEMARK OFFICE
CERTIFICATE OF CORRECTION

PATENT NO. : 7,640,216 B2  
APPLICATION NO. : 11/030252  
DATED : December 29, 2009  
INVENTOR(S) : Laubie et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 861 days.

Signed and Sealed this

Ninth Day of November, 2010

David J. Kappos  
*Director of the United States Patent and Trademark Office*